United States Patent [19]
Nugent

[11] Patent Number: 5,418,934
[45] Date of Patent: May 23, 1995

[54] SYNCHRONIZING CHAINED DISTRIBUTED DIGITAL CHRONOMETERS BY THE USE OF AN ECHO SIGNAL

[75] Inventor: Steven F. Nugent, Portland, Oreg.

[73] Assignee: Intel Corporation, Santa Clara, Calif.

[21] Appl. No.: 130,001

[22] Filed: Sep. 30, 1993

[51] Int. Cl.⁶ .............................................. G06F 1/12
[52] U.S. Cl. ........................... 395/550; 364/DIG. 1; 364/241.9; 364/271; 364/271.2; 340/825.2
[58] Field of Search ........... 340/825.2, 825.65, 825.67; 304/271.2, 931.48; 395/550

[56] References Cited

U.S. PATENT DOCUMENTS

| | | | |
|---|---|---|---|
| 2,522,758 | 9/1950 | Lesigne | 340/825.67 |
| 2,654,607 | 4/1972 | Waure et al. | 340/825.67 |
| 3,577,128 | 5/1971 | Criscimagna et al. | 395/550 |
| 3,654,608 | 4/1972 | Waure | 340/825.67 |
| 4,021,784 | 5/1977 | Kimlinger | 395/550 |
| 4,168,531 | 9/1979 | Eichelberger et al. | 395/550 |
| 4,385,351 | 5/1983 | Matsuura et al. | 395/425 |
| 4,413,259 | 11/1983 | Lutz et al. | 340/825.06 |
| 4,417,242 | 11/1983 | Bapst et al. | 340/825.05 |
| 4,419,739 | 12/1983 | Blum | 395/550 |
| 4,459,588 | 7/1984 | Grow | 340/825.05 |
| 4,736,393 | 4/1988 | Grimes et al. | 375/107 |
| 4,779,087 | 10/1988 | Fukuda et al. | 340/825.05 |
| 4,835,728 | 5/1989 | Si et al. | 395/550 |
| 4,837,850 | 6/1989 | Maisel et al. | 455/58 |
| 4,881,165 | 12/1989 | Sager et al. | 395/550 |
| 4,918,652 | 4/1990 | Bennington et al. | 395/550 |
| 5,006,979 | 4/1991 | Yoshie et al. | 395/550 |
| 5,051,987 | 9/1991 | Conlon | 370/94.1 |
| 5,086,500 | 2/1992 | Greub | 395/550 |
| 5,101,347 | 3/1992 | Balarrishman et al. | 395/800 |
| 5,109,484 | 4/1992 | Hughes et al. | 395/200 |
| 5,123,100 | 6/1992 | Hisada et al. | 395/550 |
| 5,210,858 | 5/1993 | Jensen et al. | 395/550 |
| 5,228,138 | 7/1993 | Pratt et al. | 395/550 |
| 5,309,561 | 5/1994 | Overhouse et al. | 395/550 |
| 5,313,620 | 5/1994 | Cohen et al. | 395/550 |

*Primary Examiner*—Thomas C. Lee
*Assistant Examiner*—Lance Leonard Barry
*Attorney, Agent, or Firm*—Blakely, Sokoloff, Taylor & Zafman

[57] ABSTRACT

A method and apparatus for synchronizing digital chronometers is provided in a distributed digital system having a number of nodes and a global clock for generating clock pulses. A subset of those nodes is coupled to a corresponding synchronizer while other nodes with chronometers are coupled to other synchronizers. Each synchronizer is coupled to at least one other synchronizer and receives clock pulses from the global clock and includes a counter holding a count. A sync signal is propagated in a forward direction from a first synchronizer to a last synchronizer through a chain of synchronizers. The sync signal is received and thereafter the synchronizer count is incremented at each received clock pulse. At the last synchronizer, the asserted sync signal is propagated back as an echo signal in a reverse direction from the last synchronizer to the first synchronizer through the chain of synchronizers. After receipt of the echo signal at a synchronizer, the synchronizer count is halted. Eventually the echo signal is received at the first synchronizer. After receipt of the echo signal at the first synchronizer, a decrement signal is propagated in the forward direction. At each synchronizer after first receipt of the decrement signal, a divided count is decrement upon receipt of each subsequent clock pulse. The divided count is one-half of the count immediately after the count was halted after receipt of the echo signal. When the divided count is decremented to zero, the chronometer associated with the synchronizer is started.

8 Claims, 6 Drawing Sheets

5,418,934

SYNCHRONIZING CHAINED DISTRIBUTED DIGITAL CHRONOMETERS BY THE USE OF AN ECHO SIGNAL

BACKGROUND OF THE INVENTION

1. Field of the Invention

The present invention relates to the field of information processing, and in particular to the synchronization of digital chronometers distributed in a multiprocessor environment.

2. Description of the Related Art

Many modern computer systems employ multiple processing units designed to perform a variety of tasks. In a typical mainframe or minicomputer, individual processing boards or "nodes" are mounted in a card cage and connected to a backplane so that data may be routed to and from the processing boards over a message routing network connected to the backplane. Nodes connected to one backplane may communicate with nodes connected to another backplane by connecting the backplanes of different computer cabinets.

It is often desirable to distribute a common clock throughout a multiprocessor system. For example, a system designer may wish to provide each processor board with a clock that can be used to drive a chronologic time (time of day) counter. However, as the clock signal travels from backplane to backplane, the clock signal received at backplanes at a distance from the clock source is delayed with respect to the clock signal received at backplanes nearer the clock source. This delay is due to the speed of light and buffering and propagation delays inherent in the system. In addition, as the clock signal travels away from the clock source, the clock duty cycle tends to degrade because of pulse shrinkage if intermediate buffering is employed. If the clock travels over long distances, there exists the possibility that the clock pulses would shrink so far as to disappear, leaving the farthest computer cabinets without a clock.

The problem of clock duty cycle degradation may be handled using the system of FIGS. 1A and 1B. A clock source 100 clocks a flip flop 102, which has its data input tied high. The output of flip flop 102 is cleared by the clock regeneration circuit 104 of FIG. 1B. The delay line 120 is adjusted so that that delay plus the inherent delays of flip flop 102 and gate 122 are equal to half the period of the input clock signal of flip flop 102. This ensures that the output of flip flop 102 is a pulse train with a 50% duty cycle. A further description of clock regeneration circuitry may be found in U.S. patent application Ser. No. 07/597,073, filed on Oct. 15, 1990 and owned by the Assignee of the present invention now abandoned.

The squared off clock pulses emerging from flip flop 102 are used to clock elapsed time counters (ETC) 106 on node boards 108 that are plugged into backplane 110. The elapsed time counters 106 are zeroed using a global clock reset signal that can be provided by software 112. The global clock reset signal is provided to all backplanes.

The system of FIG. 1 is generally able to maintain clock synchronization within a few microseconds among node boards distributed over approximately 30 cabinets. Although this accuracy may be adequate for some applications, many applications may require a finer granularity of measurement to determine such things as the time it takes for a message to travel from node board to node board and the time for one node board to respond to a signal transmitted by another. Of course, as mentioned above, the system may also require an absolute measurement of chronologic time.

Moreover, although the system of FIG. 1 maintains a 50% clock duty cycle, it does not provide an absolute time standard to all backplanes. Node board elapsed time counters could be synchronized using receivers tuned to radio station WWV. This is a common technique for synchronizing time-of-day counters. The receivers are localized to each backplane that contains node boards requiring chronologic time. This method is very accurate. However, it is also expensive.

SUMMARY OF THE INVENTION

The present invention provides a method and apparatus for synchronizing digital chronometers. A distributed digital system has a number of nodes and a global clock for generating clock pulses. Some nodes include a digital chronometer. A subset of those nodes is coupled to a corresponding synchronizer while other nodes with chronometers are coupled to other synchronizers. Each synchronizer is coupled to at least one other synchronizer. Each synchronizer receives clock pulses from the global clock and includes a counter holding a count. A sync signal is propagated in a forward direction from a first synchronizer to a last synchronizer through a chain of synchronizers. At each synchronizer the asserted sync signal is received. After receipt of the asserted sync signal at a synchronizer, the synchronizer count is incremented at each received clock pulse. At the last synchronizer, the asserted sync signal is propagated back as an echo signal in a reverse direction from the last synchronizer to the first synchronizer through the chain of synchronizers. After receipt of the echo signal at a synchronizer, the synchronizer count is halted. Eventually the echo signal is received at the first synchronizer. After receipt of the echo signal at the first synchronizer, a decrement signal is propagated in the forward direction. At each synchronizer after first receipt of the decrement signal, a divided count is decremented upon receipt of each subsequent clock pulse. The divided count is one-half of the count immediately after the count was halted after receipt of the echo signal. When the divided count is decremented to zero, the chronometer associated with the synchronizer is started. In one embodiment, the decrement signal is generated by negating the asserted sync signal.

BRIEF DESCRIPTION OF THE DRAWINGS

FIG. 1, comprising

DETAILED DESCRIPTION OF THE INVENTION

The present invention provides a method and apparatus for synchronizing digital chronometers. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

Figure 1A:
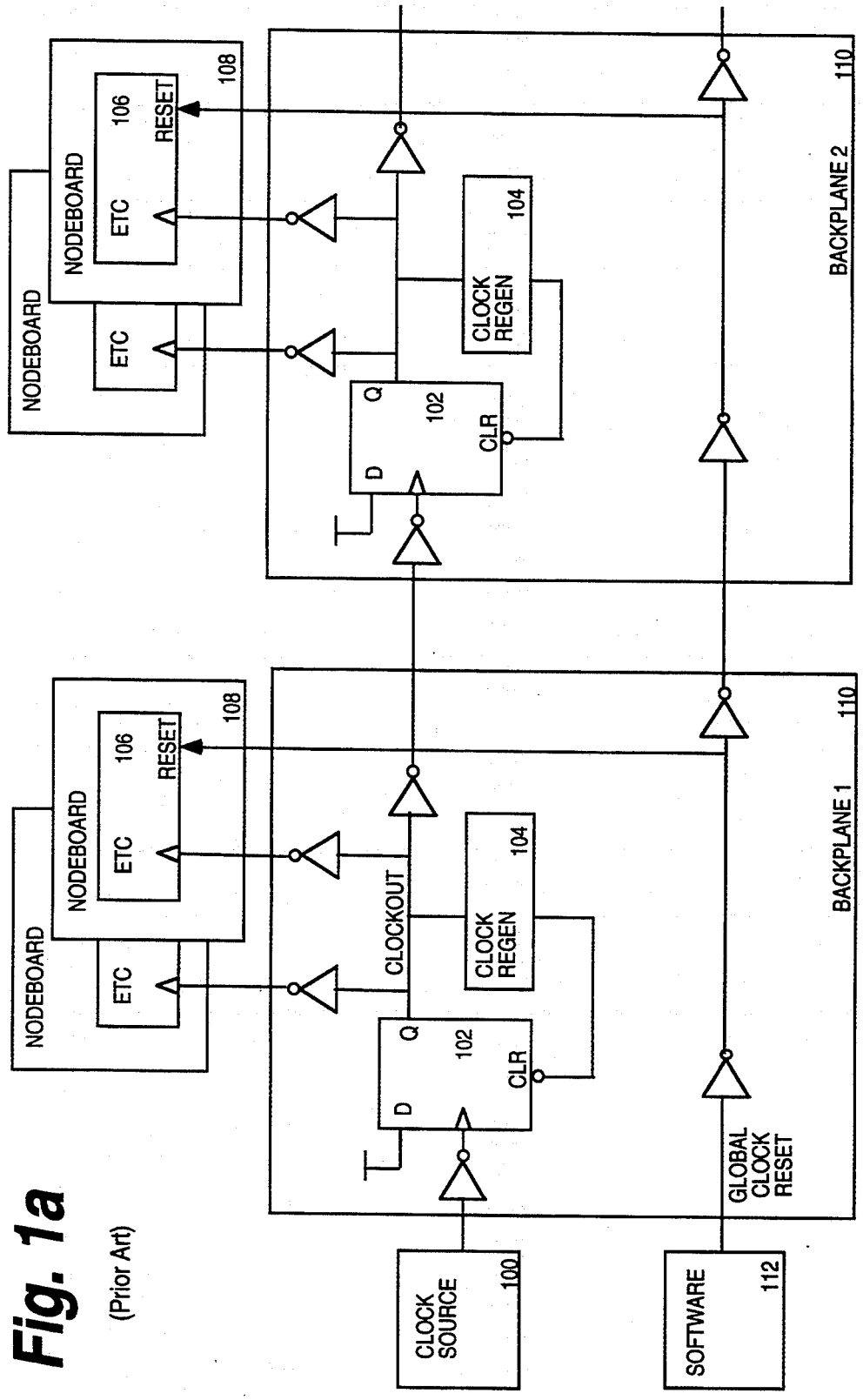
FIG. 1a and FIG 1b, is a block diagram of a multiprocessor system including a prior art clock regeneration circuit.
Figure 1B:
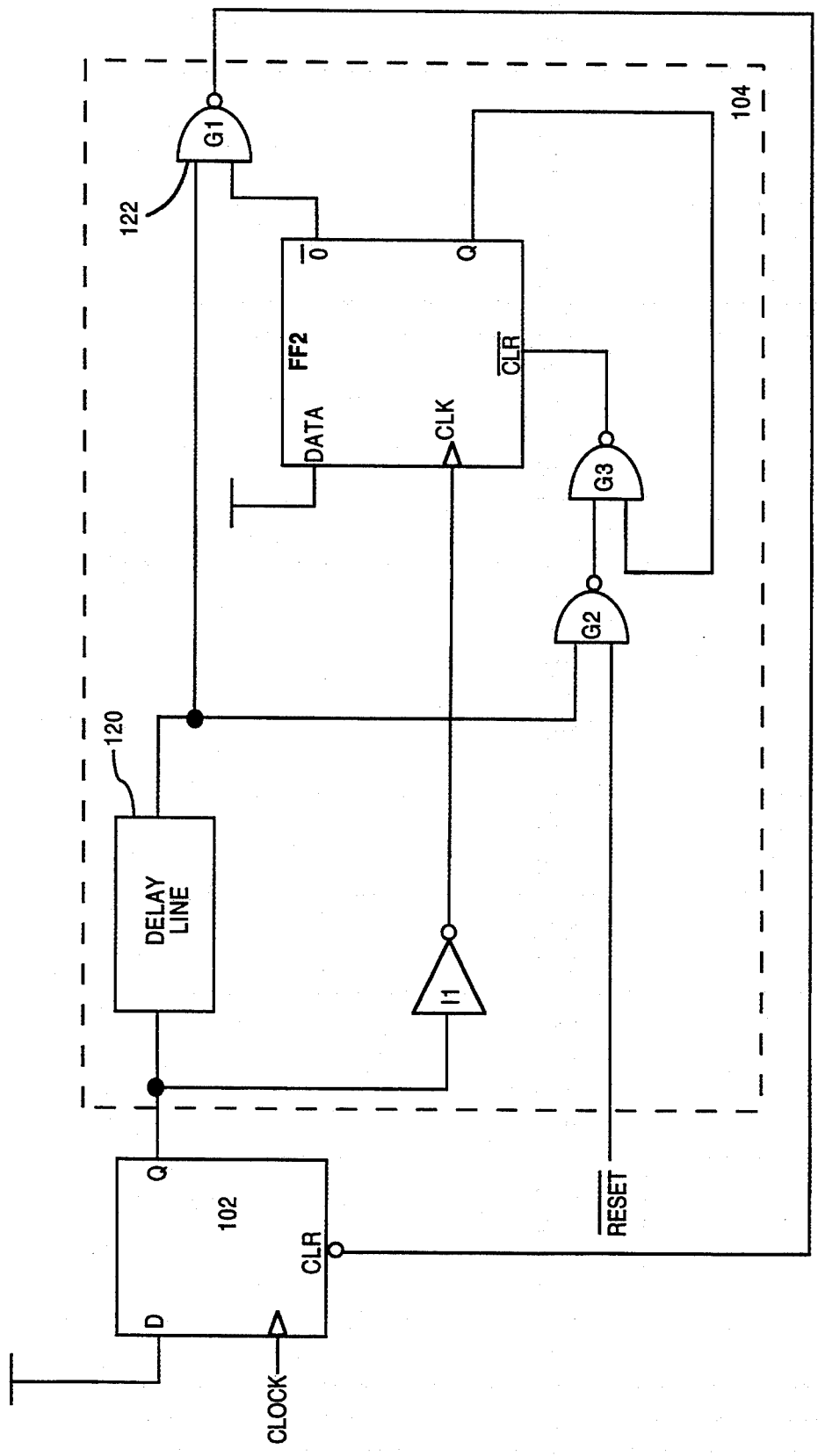
Figure 2:
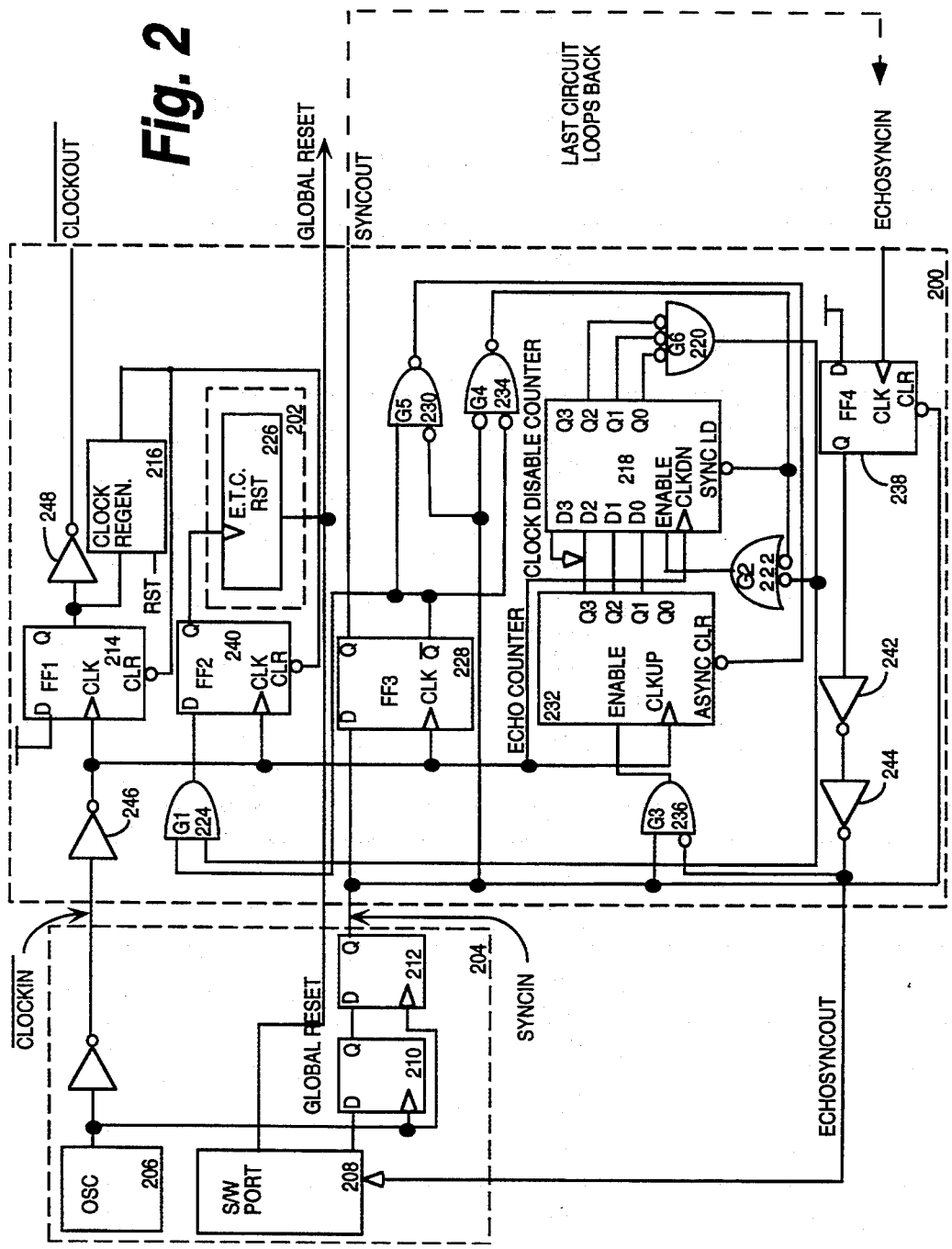
FIG. 2 is a block diagram illustrating the present invention.
Figure 3:
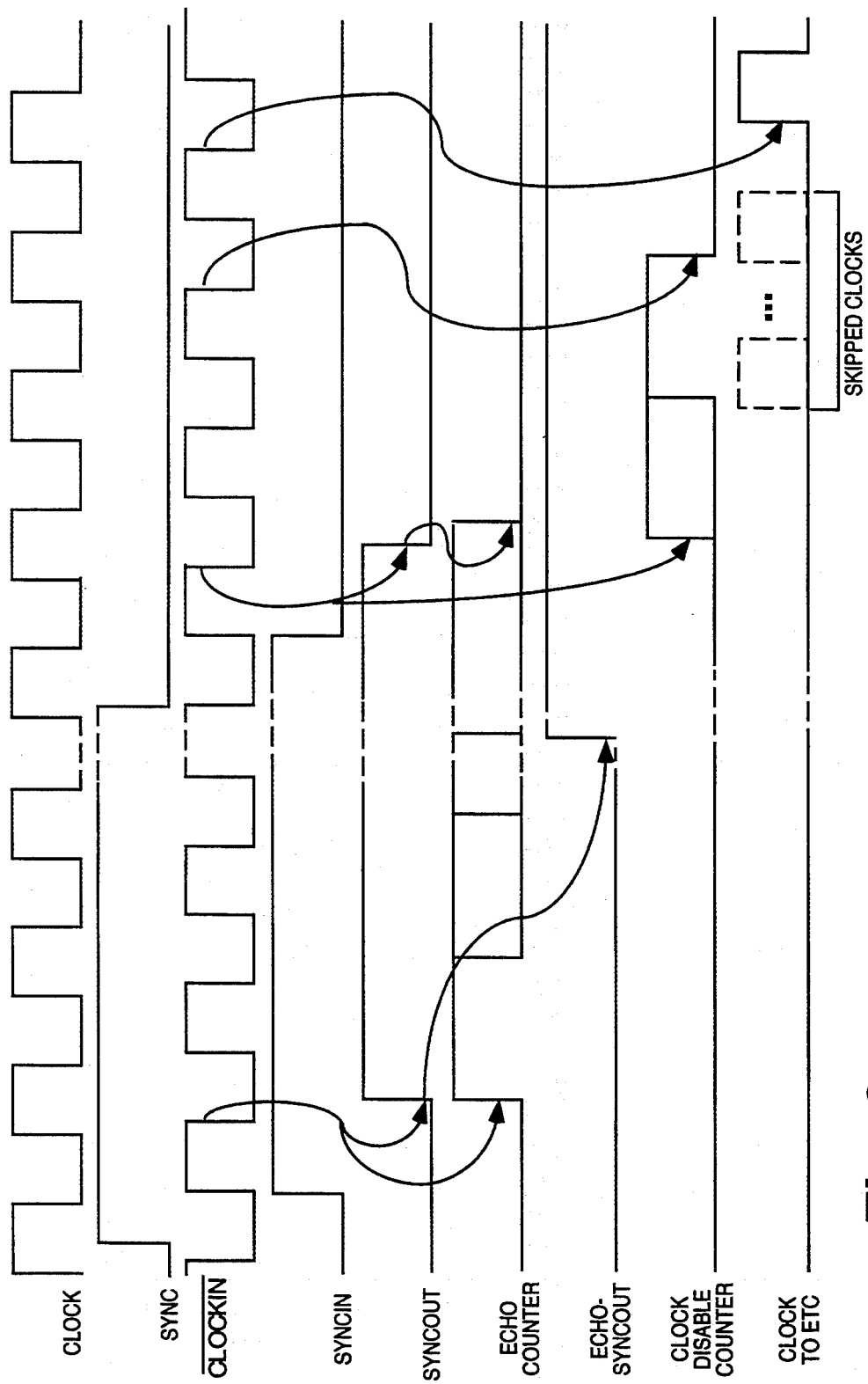
FIG. 3 is a timing diagram of the present invention.
Figure 4:
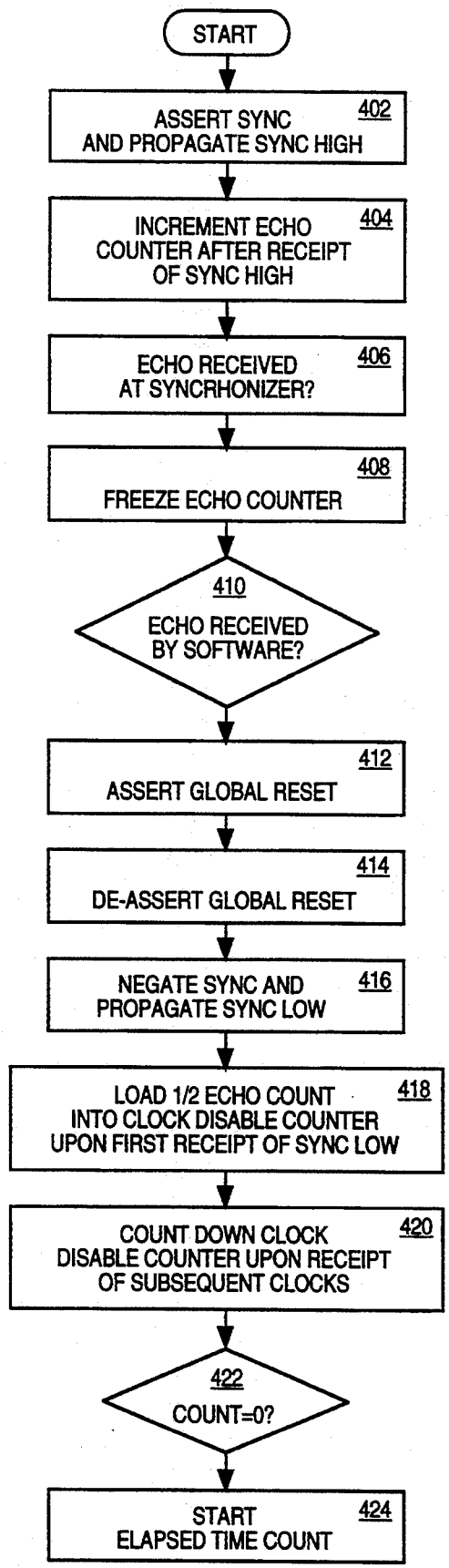
FIG. 4 is a flowchart of the method of the present invention.

FIG. 2 illustrates an embodiment of the present invention. Its timing diagram is shown in FIG. 3. Simultaneous reference is also made to the flow chart of FIG. 4, which diagrams the operation of a synchronizer. The logic circuitry of the invention is shown mounted on a backplane 200 into which are plugged node boards 202. A clock source circuit 204 is coupled to the first backplane 200. The source circuit 204 includes an oscillator 206, which provides a source clock signal. Software port 208, under software control, provides a global reset signal to all backplanes. Software port 208 also outputs a signal to flip flop 210, which is concatenated with flip flop 212 and clocked by oscillator 206 to provide a source synchronization or sync signal SYNCIN to the first backplane 200 coupled to source circuit 204. Software port 208 also receives an ECHOSYNCHOUT signal from backplane 200. The arrangement of flip flop 214(FF1) and clock regeneration circuit 216 provides the signal $\overline{\text{CLOCKOUT}}$, which maintains a 50% duty cycle from backplane to backplane. The $\overline{\text{CLOCKOUT}}$ signal is fed into the $\overline{\text{CLOCKIN}}$ input of the next backplane.

On power up, SYNCIN is initially low, forcing the output $\overline{Q}$ of flip flop 228 high. Also, assume that the outputs Q0, Q1 and Q2 of clock disable counter (CDC) 218 are not equal to zero. If this is true then the output of gate 220 will be a zero. This will make the output of gate 222 also a one, enabling the CDC 218 to count down on each clock pulse until the outputs Q0, Q1 and Q2 are all equal to zero. This zero output condition will set gate 220 to one so that the output of gate 222 will become a zero, thus disabling the CDC. At the same time, the high output on gate 220 will make the output of gate 224 high.

Elapsed time counter (ETC) 226 is clocked by flip-flop 240, which also clocks the elapsed time counters on all nodeboards 202 plugged into backplane 200 in this embodiment. Gate 224 controls when flip-flop 240 clocks elapsed time counter (ETC) 226. Before gate 224 was asserted high, ETC 226 was turned off. Also, because SYNCIN is initially low, forcing $\overline{Q}$ of the third flip flop 228 high, the output of gate 230 is also low, making the ASYNC dear input of echo counter 232 low. This condition clears the outputs Q0–Q3 of echo counter 232. The state of SYNCIN being low and $\overline{Q}$ of flip flop 228 being high forces the output of gate 234 to a one, meaning that the SYNC LD input of clock disable counter 218 is disabled. The SYNC LD function, when enabled, broadside loads the outputs Q1, Q2 and Q3 from echo counter 232 through the inputs D0, D1 and D2 to the outputs Q0, Q1 and Q2 of clock disable counter 218.

To reiterate, gate 224 is now high, causing ETC 226 to be clocked. However, at this point ETC 226 is not yet synchronized with the elapsed time counters of the other backplanes. To begin the synchronization process, through software port 208, software asserts the SYNCIN signal to high. The high SYNCIN signal is passed through flip flop 228 as the SYNCOUT output, which is fed into the SYNCIN input of the next backplane (step 402). In this manner, as the $\overline{\text{CLOCKIN}}$ pulse is received by each synchronizer, a high SYNCIN signal is successively captured in flip flop 228 of all subsequent concatenated backplanes.

The high SYNCIN signal sets $\overline{Q}$ of flip flop 228 low, thus disabling the ASYNC dear input of echo counter 232. The ECHOSYNCOUT signal is initially low and is set high upon receipt of a high ECHOSYNCIN signal. In the last backplane of the chain, the SYNCOUT output is tied to the ECHOSYNCIN input. Thus, ECHOSYNCIN at a particular backplane is high when the SYNCOUT signal has returned from its "round trip" through the backplanes that follow that particular backplane. Because ECHOSYNCOUT is low until that time and SYNCIN is high, the output of gate 236 is set high, thus enabling the echo counter 232 to start counting.

Also, because the state of SYNCIN being high forces $\overline{Q}$ of flip flop 228 low, the output of gate 224 is low, thus stopping the count on ETC 226.

As the SYNC signal propagates from the SYNCOUT of one backplane to the SYNCIN input of another, it is clocked by the $\overline{\text{CLOCKIN}}$ signal, which is the $\overline{\text{CLOCK OUT}}$ signal of the previous backplane. As the SYNCIN signal propagates, the echo counter 232 on the backplane receiving the SYNC signal is enabled, causing the counter 232 to increment with each clock cycle (step 404). When the SYNC signal reaches the last backplane it is sent back as an echo signal because on the last backplane the SYNCOUT output is tied to the ECHOSYNCIN input. When the echo signal ECHOSYNCIN is received by flip flop 238 on the backplane, it clocks flip flop 238 to set ECHOSYNCOUT high. Through AND gate 236 this high signal disables the echo counter 232 and freezes the count (steps 406, 408). In this manner, the echo counter 232 holds a count representing the time it takes for the SYNC signal to travel from the backplane associated with that counter to the last backplane and return back to the former backplane. Each backplane is thus provided with a count referencing it to the last backplane. The first backplane will start counting first and will stop counting last. Conversely, the last backplane will start counting last and stop counting first, so that the first backplane holds the largest count while the last backplane holds the smallest count.

All synchronizers wait until the echo signal is echoed back and received by the first backplane and received at the software port 208 (step 410). At that point, the ECHOSYNCOUT input to the software port 208 is set high. Upon receiving ECHOSYNCOUT, the software asserts the global clock reset signal to dear all elapsed time counters 226 on all node boards 202 (step 412). Thereafter, the software deasserts the global clock reset signal (step 414). The software also deasserts the SYNCIN signal. The deasserted SYNCIN signal propagates until it has reached the last backplane (step 416).

After negating SYNCIN and before flip flop 228 is clocked, the state of the $\overline{Q}$ output of flip flop 228 is low at the same time SYNCIN is low. This causes the output of gates 234 to also go low, resulting in enablement of the SYNC LD input of clock disable counter 218. In this state the count on the Q1–Q3 outputs of echo counter 232 is broadside loaded into the Q0, Q1 and Q2 outputs of clock disable counter 218 on the next received clock cycle. The Q1, Q2 and Q3 outputs of echo counter 232 are fed into the D0, D1 and D2 inputs of clock disable counter 218, respectively. This configuration results in a shifting of the echo counter output to the right by one bit, which is equivalent to dividing the count by two (step 418). Because the echo counter counts the time it takes for the SYNC signal to leave a backplane and return, the count must be divided by two to obtain the temporal distance between a backplane and the last backplane.

Because the output of gate 234 is low, the clock disable counter 218 is enabled for at least one clock cycle before flip flop 228 is clocked in order to load the echo counter count into the clock disable counter.

After the echo count has been loaded into the CDC 218, the outputs Q0–Q2 of CDC 218 are no longer zero. Due to this state, the output of gate 220 is made low, thus enabling CDC 218 through OR gate 222 even after flip flop 228 has been clocked. After flip flop 228 has been clocked, the output $\bar{Q}$ of flip flop 228 is one, while SYNCIN is zero, causing the output of gate 234 to be one, thereby disabling the SYNC LD of CDC 218 to prevent further broadside loads. The low output of gate 220 is also passed to gate 224 to prevent flip flop 240 from issuing any clocks to the ETC 226.

As CDC 218 is clocked, CDC 218 decrements the counts of its output (step 420). When the outputs Q0–Q2 of the CDC all reach a zero value, then the output of gate 220 is enabled, which disables CDC 218 through OR gate 222 and at the same time enables gate 224, so that ETC 226 begins counting (steps 422, 424).

Figure 5:
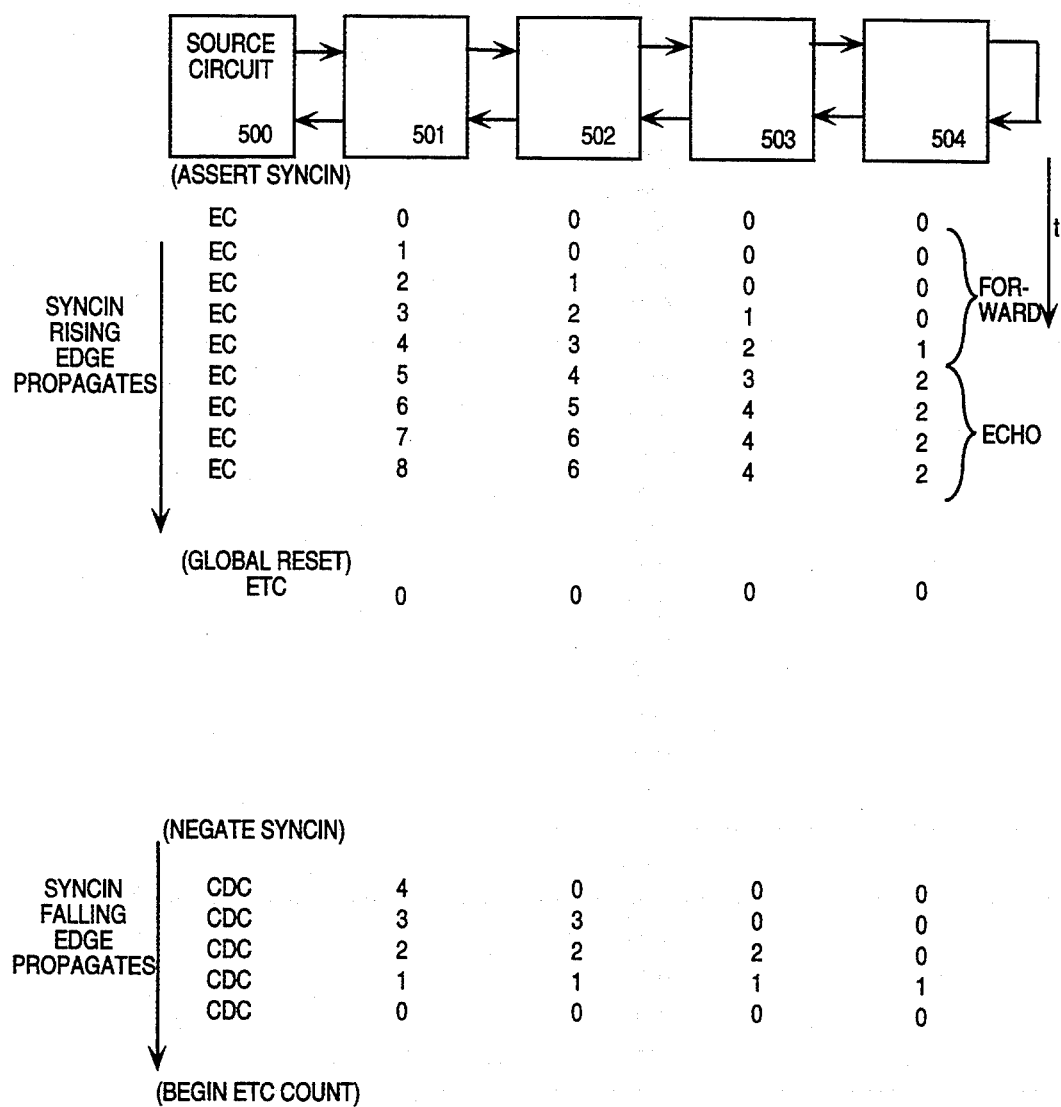
FIG. 5 is a chart illustrating the synchronization of four backplanes using the present invention.

FIG. 5 illustrates an example of the present invention using four backplanes, 501, 502, 503 and 504. The first backplane 501 is coupled to the source circuit 500. Each backplane includes a synchronization circuit of the present invention. The state of the counters in each backplane over time is charted directly below each backplane. To simplify this example, the delay from the input of one synchronizer to the input of the next synchronizer is assumed to be equal to one clock cycle. In general, the delay through the synchronizers may be different and not an exact multiple of a clock cycle.

Initially, the echo counter (EC) in each backplane is in a zero state. Software in the source circuit 500 asserts SYNCIN, which propagates through the backplanes. On the first clock cycle received by the first backplane 501, the first backplane 501 latches the high SYNCIN signal. Some time later (the next clock cycle in this example), the high SYNCIN signal that was latched in the first clock cycle propagates to the second backplane 502. At the same time, the echo counter in the first backplane 501 increments. This process continues until the fourth clock cycle in this example, when the high SYNCIN signal that was latched in the first clock cycle is latched by the synchronization circuit in backplane 504. On the next clock cycle, the echo counter in that backplane is incremented to a count of one and all other backplanes also increment.

On the next clock cycle, the echo counter in the last backplane is incremented to a count of two. Also, SYNCOUT is fed back as ECHOSYNCIN in order to clock flip flop 238, setting the output of that flip flop high. That output is delayed slightly by buffers 242 and 244, which provide an ECHOSYNCOUT signal, which in turn is fed into the ECHOSYNCIN input of the previous backplane. That output is also fed to gate 236 to disable and freeze the echo counter. Thus, as the echo signal propagates along the return path in the chain of backplanes, it freezes the echo counters in those backplanes on subsequent clock cycles as each backplane receives the echo signal.

After the echo signal reaches the ECHOSYNCOUT output of the first backplane, it is fed into software port 208, which negates the SYNCIN signal and globally resets the elapsed time counters.

The falling edge of the negated SYNCIN signal propagates through the backplanes in the forward direction. The first time a backplane receives the low SYNCIN signal it loads one half of its echo count into its clock disable counter. Thus, when the first backplane receives the low SYNCIN signal the first time, one half the echo count of eight is loaded into the CDC. Later, the second backplane 502 receives the low SYNC signal for the first time, resulting in the loading of one half the echo count of six into the CDC of backplane 502. Also during that clock cycle, the CDC of backplane 501 decrements. This process continues, resulting in the CDCs of all backplanes counting down to zero at the same instant in time. At that point, all backplanes start their elapsed time count. Thus, the present invention results in synchronization of all backplanes at the same instant in time.

Note that buffers 242 and 244 are complemented by buffers 246 and 248 to provide equal propagation delays in both directions of the round trip of the backplane chain. To ensure equal propagation delays, all four buffers should be on the same integrated circuit so that they exhibit the same physical characteristics. For the same reason, flip flops 214 and 238 should also reside on the same integrated circuit. Equality of the upstream and downstream delays is necessary because the echo count is divided by two, requiring that the measurement of time in both directions be equal. Further, to ensure proper operation of the circuitry, the sum of the delays through buffers 246 and 248 must be greater than the set up time of flip flop 228.

Also, when using clock frequencies on the order of 100 megahertz or greater or when using extremely large machines, the synchronizing of the present invention may require more than three bits for the echo counter and clock disable counter. At higher frequencies, the effective distance between processors on different node boards is longer. In such situations, greater accuracy can also be achieved by including one synchronization circuit of the present invention per node board, rather than only one per backplane.

As mentioned above, current systems maintain an accuracy of approximately one microsecond in multiprocessor configurations of approximately 30 cabinets. The present invention is far more precise, achieving tolerances within one clock cycle, which is typically on the order of ±50 nanoseconds or smaller at current system frequencies. In addition, the improvements of the present invention remove the limitation of 30 cabinets maximum machine size. The present invention allows multiprocessor systems to be scalable without limit.

Although the invention has been described in conjunction with preferred embodiments, it will be appreciated that various modifications and alterations may be made by those skilled in the art without departing from the spirit and scope of the invention. In particular, much of the circuitry of the present invention may be implemented using programmable array logic (PAL). Moreover, the present invention may be extended to provide synchronization in more than one dimension.

What is claimed is:

1. In a distributed digital system having a plurality of nodes and a system clock for generating clock pulses, at least two nodes each comprising a node clocking device and a synchronizer, each synchronizer being coupled to the clock to receive clock pulses, each synchronizer further being coupled to at least one other synchronizer to form a chain of synchronizers dilineated by a first synchronizer and a last synchronizer, each synchronizer having a counter holding a count, a method for synchronizing said node clocking devices comprising the steps of:

asserting a sync signal;
propagating said asserted sync signal in a forward direction from the first synchronizer to the last synchronizer through the chain of synchronizers;
at each synchronizer:
  receiving said asserted sync signal;
  incrementing said count at each received clock pulse after receipt of said asserted sync signal;
at said last synchronizer:
  propagating said asserted sync signal back as an echo signal in a reverse direction from said last synchronizer to said first synchronizer through said chain of synchronizers;
at each synchronizer:
  receiving said echo signal;
  halting said count after receipt of said echo signal;
at said first synchronizer:
  receiving said echo signal;
  propagating a decrement signal in said forward direction after receipt of said echo signal;
at each synchronizer:
  after first receipt of said decrement signal, decrementing a divided count upon receipt of each subsequent clock pulse, wherein said divided count is one half of the count immediately after said halting step;
  starting said node clocking device associated with said synchronizer when said divided count reaches zero.

2. The method of claim 1, further comprising the step of:
resetting the node clocking devices upon receipt of said echo signal at said first synchronizer.

3. The method of claim 1, further comprising the step of:
negating said asserted sync signal to generate said decrement signal.

4. In a distributed digital system comprising a clock for generating clock pulses and a plurality of nodes comprising a synchronizer and a chronometer coupled to the synchronizer, each synchronizer is coupled to at least one other synchronizer to form a series of connected synchronizers, each synchronizer comprising:
an first input for receiving the clock pulses generated by the clock;
a second input for receiving a first signal;
a third input for receiving a second signal, said second signal arriving at a time subsequent to the first signal;
a first counter coupled to the first, second and third inputs, said counter,
  after receipt of the first signal, incrementing a count at each received clock pulse,
  after receipt of the second signal, stopping the count and outputting the stopped count;
a divider coupled to the counter for dividing the stopped count in half to generate a divided count;
a second counter coupled to the divider for decrementing the divided count at each received clock pulse;
a first output for outputting an output signal to start the chronometer when the second counter decrements to zero.

5. The synchronizer as set forth in claim 4, wherein:
the digital system further comprises a sync pulse generator that generates a sync pulse;
said series of connected synchronizers dilineated by a first synchronizer and a last synchronizer, said first synchronizer further coupled to the sync pulse generator to receive as the first signal the sync pulse;
each of said synchronizers, except for the last synchronizer, further comprising a second output for outputting a propagated first signal received at the second input, such that the second signal comprises the propagated second signal of a preceding adjacent synchronizer and a third output for outputting a propagated second signal received at the third input, such that the third signal comprises the propagated third signal of a subsequent adjacent synchronizer; and
said last synchronizer further comprising a fourth output for outputting the propagated first signal as the third signal to the second input of the preceding adjacent synchronizer.

6. In a distributed digital system comprising a clock for generating clock pulses and a plurality of nodes comprising a synchronizer and a clocking device coupled to the synchronizer, each synchronizer is coupled to at least one other synchronizer to form a series of connected synchronizers, each synchronizer comprising:
input means for receiving the clock pulses generated by the clock, for receiving a first signal, and for receiving a second signal, said second signal arriving at a time subsequent to the first signal;
counting means coupled to the input means comprising:
  means for incrementing a count at each received clock pulse after receipt of the first signal; and
  means for stopping the count after receipt of the second signal and outputting the stopped count;
dividing means coupled to the counting means for dividing the stopped count in half to generate a divided count;
decrementing means coupled to the dividing means for decrementing the divided count at each received clock pulse;
an output means for outputting an output signal to start the clocking device when the decrementing means decrements to zero.

7. The synchronizer as set forth in claim 6, wherein:
the digital system further comprises a sync pulse generator that generates a sync pulse;
said series of connected synchronizers dilineated by a first synchronizer and a last synchronizer, said first synchronizer further coupled to the sync pulse generator to receive as the first signal the sync pulse;
each of said synchronizers, except for the last synchronizer, said output means further outputting a second output for outputting a propagated first signal received at the input means, such that the second signal comprises the propagated second signal of a preceding adjacent synchronizer, and a third outputting a propagated second signal received at the input means, such that the third signal comprises the propagated third signal of a subsequent adjacent synchronizer; and said output means of the last synchronizer further outputting the propagated first signal as the third signal to the input means of the preceding adjacent synchronizer.

8. A distributed digital system comprising:

a clock for generating clock pulses;

a sync generator for generating a sync pulse;

a plurality of nodes, each node comprising a synchronizer and a node clocking device, each synchronizer coupled to at least one other synchronizer to form a chain of connected synchronizers dilineated by a first synchronizer and a last synchronizer;

said first synchronizer coupled to receive the sync pulse and propagate a the sync pulse, said synchronizers of the chain of said synchronizers between the first synchronizer and the last synchronizer propagating a received sync pulse to a subsequent adjacent synchronizer, such that the sync pulse received by the first synchronizer is propagated from the first synchronizer to the last synchronizer;

said last synchronizer generating an echo signal upon receipt of the propagated sync signal, said echo signal input to an adjacent preceding synchronizer in the chain of synchronizers for propagation to the first synchronizer, said synchronizers of the chain of said synchronizers between the last synchronizer and the first synchronizer propagating the echo signal to a preceding adjacent synchronizer, such that the echo signal generated by the last synchronizer is propagated to the first synchronizer;

each synchronizer comprising:

a first input for receiving the clock pulses generated by the clock;

a first counter coupled to receive the clock pulses, the sync pulse and the echo signal, said counter, after receipt of the first signal, incrementing a count at each received clock pulse, after receipt of the second signal, stopping the count and outputting the stopped count;

a divider coupled to the counter for dividing the stopped count in half to generate a divided count;

a second counter coupled to the divider for decrementing the divided count at each received clock pulse;

a first output for outputting an output signal to start the node clocking device when the second counter decrements to zero.

* * * * *

UNITED STATES PATENT AND TRADEMARK OFFICE
CERTIFICATE OF CORRECTION

PATENT NO.   :   5,418,934
DATED        :   May 23, 1995
INVENTOR(S)  :   Nugent It is certified that error appears in the above-identified patent and that said Letters Patent is hereby corrected as shown below:

On the title page, in section [57], in the 24th line of the Abstract, delete "decrement" and substitute --decremented--

In column 3, at line 49, delete "dear" and substitute --clear--

In column 4, at line 4, delete "dear" and substitute --clear--

In column 4, at line 49, delete "dear" and substitute --clear--

Signed and Sealed this

Fifteenth Day of October, 1996

*Attest:*

BRUCE LEHMAN

*Attesting Officer*     *Commissioner of Patents and Trademarks*